United States Patent Office 3,639,463
Patented Feb. 1, 1972

3,639,463
15(R)-PGE₁ AND RELATED COMPOUNDS
John E. Pike and William P. Schneider, Kalamazoo, Mich., assignors to The Upjohn Company, Kalamazoo, Mich.
No Drawing. Filed May 22, 1968, Ser. No. 731,314
Int. Cl. C07c *61/36, 69/08*
U.S. Cl. 260—488 R     5 Claims

ABSTRACT OF THE DISCLOSURE

The invention relates to three new prostanoic acid derivatives, 15(R)-PGE₁, 15(R)-PGE₁ 15-formate, and 15(S)-PGE₁ 15-formate, and to methods for producing those. 15(R)-PGE₁ is useful as a smooth muscle stimulator. 15(S)-PGE₁ 15-formate is useful to inhibit blood platelet aggregation. 15(R)-PGE₁ 15-formate is used to make 15(R)-PGE₁.

DESCRIPTION OF THE INVENTION

This invention relates to novel compositions of matter, to novel methods for producing them, and to novel chemical intermediates useful in those methods. In particular, this invention relates to novel compounds of the formula:

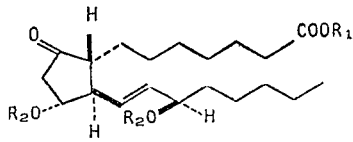

I wherein $R_1$ is hydrogen, alkyl of one to 8 carbon atoms, inclusive, or a pharamacologically acceptable cation, and $R_2$ is hydrogen or alkanoyl of one to 8 carbon atoms, inclusive.

The systematic name for the compound of Formula I wherein $R_1$ and $R_2$ are hydrogen is 3α-hydroxy-2β-[3(R)-hydroxy-trans-1-octenyl]-5-oxo-1α-cyclopentaneheptanoic acid. This name is cumbersome, and we prefer 15(R)-PGE₁ as a name for the compound of Formula 1 wherein $R_1$ and $R_2$ are hydrogen.

Examples of alkyl of one to 8 carbon atoms are methyl, ethyl, propyl, butyl, pentyl, hexyl, heptyl, octyl, and isomeric forms thereof.

Examples of alkanoyl of one to 8 carbon atoms, inclusive, are formyl, acetyl, propionyl, butyryl, valeryl, hexanoyl, heptanoyl, octanoyl, and isomeric forms thereof.

Pharmacologically acceptable cations within the scope of $R_1$ in Formula I are the cationic form of a metal, ammonia, or an amine, or are quaternary ammonium ions.

Especially preferred metal cations are those derived from the alkali metals, e.g., lithium, sodium, and potassium, and from the alkaline earth metals, e.g., magnesium, calcium, strontium, and barium, although the cationic form of other metals, e.g., aluminum, zinc, iron, and silver is within the scope of this invention.

Pharmacologically acceptable amine cations within the scope $R_1$ in Formula I are those derived from primary secondary, or tertiary amines. Examples of suitable amines are methylamine, dimethylamine, trimethylamine, ethylamine, dibutylamine, triisopropylamine, N-methylhexylamine, dodecylamine, allylamine, crotylamine, cyclopentylamine, dicyclohexylamine, benzylamine, dibenzylamine, α-phenylethylamine, β-phenylethylamine, ethylenediamine, diethylenetriamine, and like lower-aliphatic, lower-cycloaliphatic, and lower-araliphatic amine containing up to and including about 18 carbon atoms, as well as heterocyclic amines such as piperidine, morpholine, pyrrolidine, piperazine, and lower-alkyl derivatives thereof, such as 1-methylpiperidine, 4-ethylmorpholine, 1-isopropylpyrrolidine, 2-methylpyrrolidine, 1,4-dimethylpiperazine, 2-methylpiperidine, and the like, as well as amines containing water-solubilizing or hydrophilic groups, such as mono-, di-, and triethanolamine, ethyldiethanolamine, N-butylethanolamine, 2-amino-1-butanol, 2-amino-2-ethyl-1, 3-propanediol, 2 - amino-2-methyl-1-propanol, tris(hydroxymethyl)aminomethane, N-phenylethanolamine, N-(p-tert-amylphenyl)diethanolamine, galactamine, N-methylglucamine, N-methylglucosamine, ephedrine, phenylephrine, epinephrine, procaine, and the like.

Examples of suitable pharmacologically acceptable quaternary ammonium cations within the scope of $R_1$ in Formula I are tetramethylammonium, tetraethylammonium, benzyltrimethylammonium, phenyltriethylammonium, and the like.

The novel compound of this invention, 15(R)-PGE₁ (Formula I wherein $R_1$ and $R_2$ are hydrogen), is somewhat similar in structure to the naturally-occurring compound, prostaglandin E₁ (PGE₁). The latter compound has the structure:

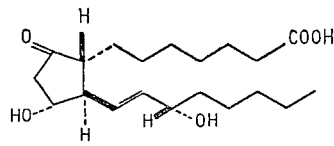

II

Comparison of Formula I with Formula II shows that novel compounds of this invention differ in structure from PGE₁ and its esters and salts in that the latter have the side chain hydroxy or alkanoxy moiety attached in the S configuration, while in the novel Formula I compounds of this invention, those moieties are attached in the R configuration. See Nature, 212, 38 (1966) for a discussion of the stereochemistry of natural PGE₁. To avoid confusion hereinafter, natural PGE₁ will be identified as 15(S)-PGE₁.

There are striking and totally unexpected differences in properties between the novel Formula I compounds of this invention, and 15(S)-PGE₁ and its salts and esters. For example, the latter compounds are extremely potent in lowering systemic arterial blood pressure when injected intravenously. See, for example, Horton, Experientia 21, 113 (1965). On the other hand, the Formula I compounds of this invention cause only a slight lowering of systemic arterial blood pressure compared with the Formula II compounds, for example, as measured in anesthetized (pentobarbital sodium) pentolinium-treated rats with indwelling aortic and right heart cannulas. For example, 15(R)-PGE₁ has only one percent of the activity of 15(S)-PGE₁ in this test. See Pike et al., Proc. Nobel Symposium II, Stockholm (1966); Interscience Publishers, New York, pp. 161–172 (1967), for measurement methods.

Moreover, 15(S)-PGE₁ and its salts and esters are potent antagonists of epinephrine-induced mobilization of free fatty acids. See, for example, Horton, cited above. On the other hand, the Formula I compounds of this invention have only slight activity in that regard. For example, 15(R)-PGE₁ has less than one percent of the activity of 15(S)-PGE₁ in this regard.

It is also known that 15(S)-PGE₁ and its salts and esters are extremely potent in causing stimulation of smooth muscle, as shown, for example, by tests on strips of guinea pig ileum, rabbit duodenum, and gerbil colon. See, for example, Horton, cited above. These same known compounds are also highly active in potentiating other known smooth muscle stimulators, for example, oxytocin and vasopressin. For these reasons, these known Formula II compounds are useful in place of or in combination with less than usual amounts of these known smooth muscle stimulators, for example, to control or prevent atonic uterine bleeding after abortion or delivery. See Bergstrom et al., Pharmacol. Rev. 20, 1 (1968), and references cited therein. The novel Formula I compounds of this invention are also very active as smooth muscle stimulators, and can be used for the same related purposes as 15(S)-PGE$_1$ and its salts and esters. However, the novel Formula I compounds are superior for those purposes because of this surprising and unexpected split in biological activities. As mentioned above, 15(S)-PGE$_1$ and its salts and esters are potent depressors and inhibit free fatty acid release, and thus those biological responses occur whenever those known compounds are used as smooth muscle stimulators. The novel Formula I 15(R)-PGE$_1$, and its salts and esters, on the other hand, show no significant depressor activity or free fatty acid release inhibition, and thus are far more useful as smooth muscle stimulators because they are far more specific in their action, and cause far fewer undesired physiological responses or side effects.

For smooth muscle stimulation, the novel Formula I compounds of this invention are administered systemically, e.g., intravenously, intramuscularly, subcutaneously, orally, rectally, intravaginally, and in the form of sterile transplants for prolonged action. For rapid response, especially in emergency situations, the intravenous route of administration is preferred. Intramuscular injection is also a preferred route of administration, especially to follow up initial intravenous administration.

For intravenous injection or infusion, sterile aqueous isotonic solutions or suspensions are preferred. For that purpose, it is preferred because of increased water solubility that R$_1$ in the Formula I compound be hydrogen or a pharmacologically acceptable cation. For subcutaneous or intramuscular injection, sterile solutions or suspensions of the acid, salt, or ester form in aqueous or non-aqueous media are used. Tablets, capsules, and liquid preparations such as syrups, elixers, and simple solutions, with the usual pharmaceutical carriers are used for oral administration. For rectal or vaginal administration, suppositories prepared as known in the art are used. For tissue implants, a sterile tablet or silicone rubber capsule or other object containing or impregnated with the substance is used.

Doses in the range about 0.002 to about 10 mg. per kg. of body weight per day are used, the exact dose depending on the age, weight, and condition of the patient, and on the frequency and route of administration.

The novel Formula I compound wherein R$_1$ and R$_2$ are hydrogen, i.e., 15(R)-PGE$_1$, is prepared by hydrolysis of the corresponding 15(R)-formate ester, i.e., a compound of the formula:

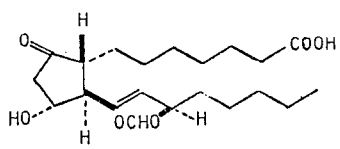

III

This novel 15(R)-PGE$_1$ 15-formate is prepared by maintaining 15(S)-PGE$_1$ in formic acid buffered with an alkali metal formate in the range 10° to 50° C. until a substantial amount of the 15(S)-PGE$_1$ has been transformed to the 15-formate. A mixture of the Formula III 15(R)-PGE$_1$ 15-formate and the corresponding 15(S)-PGE$_1$ 15-formate is thereby obtained. The structural formula of the latter compound is:

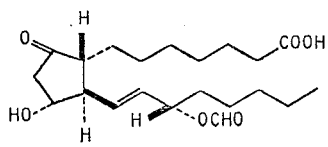

IV

These two novel 15-formates, 15(R) and 15(S), are separated by known methods, e.g., by chromatography.

The novel 15(S)-PGE$_1$ 15-formate can be hydrolyzed back to 15(S)-PGE$_1$, which can then be transformed as before to a mixture of the 15(R) and 15(S) 15-formates. Thus the yield of 15(R)-PGE$_1$ from 15(S)-PGE$_1$ is increased. However, the 15(S)-PGE$_1$ 15-formate, its esters, and its pharmacologically acceptable salts are also useful for pharmacological purposes. These have the general formula:

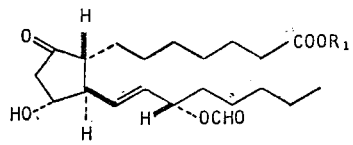

V wherein R$_1$ is hydrogen, alkyl of one to 8 carbon atoms, inclusive, or a pharmacologically acceptable cation.

As described above, 15(S)-PGE$_1$ is extremely potent in the stimulation of smooth muscle and in lowering systemic arterial blood pressure. In striking contrast, and completely unexpectedly, the novel 15-formates of 15(S)-PGE$_1$ (Formula V) have less than one percent of the smooth muscle stimulatory activity of 15(S)-PGE$_1$ and between one and 10 percent of the depressor activity of 15(S)-PGE$_1$.

It is also known that 15(S)-PGE$_1$ is highly active in inhibiting blood platelet aggregation and thrombus formation induced by various physical stimuli, e.g., arterial injury, and by various biochemical stimuli, e.g., collagen, ADP, and thrombin, and in causing thrombi to disaggregate, both in vivo and in vitro. See, for example, Emmons et al., British Medical Journal, 2, 468 (1967) and Kloeze, Proc. Nobel Symposium II, Stockholm (1966); Interscience Publishers, New York, pp. 241–252 (1967). The novel Formula V compounds of this invention are also highly active in this same regard. However, as pointed out above, 15(S)-PGE$_1$ is also a potent smooth muscle stimulator and depressor. Those biological properties will, of course, cause undesired physiological responses in the patient during administration of the substance for the prevention and control of thrombus formation, and for the removal of thrombi. Quite surprisingly and unexpectedly, those undesired physiological responses do not occur during administration of the novel Formula V compounds of this invention for the same purpose. Therefore, those novel Formula V compounds are useful whenever it is desired to inhibit platelet aggregation, to reduce the adhesive character of platelets, and to remove or prevent the formation of thrombi in mammals, including man, rabbits, and rats. For example, the novel Formula V compounds of this invention are useful in the treatment and prevention of myocardial infarcts, to treat and prevent post-operative thrombosis, to promote patency of vascular grafts following surgury, and to treat conditions such as atherosclerosis, arteriosclerosis, blood clotting defects due to lipemia, and other clinical conditions in which the underlying etiology is associated with lipid imbalance or hyperlipidemia.

For the above purposes, the novel compounds of this invention are administered systemically, e.g., intravenously, subcutaneously, intramuscularly, orally, rectally, and in the form of sterile implants for prolonged action. For rapid response, especially in emergency situations, the intravenous route of administration is preferred.

For intravenous injection or infusion, sterile aqeuous isotonic solutions or suspensions are preferred. For subcutaneous or intramuscular injection, sterile solutions or suspensions in aqueous or non-aqueous media are used. Tablets, capsules, and liquid preparations such as syrups, elixers, and simple solutions, with the usual pharmaceutical carriers are used for oral administration. For rectal administration, suppositories prepared as known in the art are used. For tissue implants, a sterile tablet or silicone rubber capsule or other object containing or impregnated with the substance is used.

Doses in the range about 0.004 to about 20 mg. per kg. of body weight per day are used, the exact dose depending on the age, weight, and condition of patient, and on the frequency and route of administration.

As mentioned above, 15(R)-PGE$_1$ is prepared by hydrolysis of the corresponding 15(R)-formate ester. Also as mentioned above, the latter is prepared by reacting 15(S)-PGE$_1$ with formic acid.

For the latter reaction, the formic acid should be substantially free of water and acids stronger than formic acid. Strong acids are frequent impurities in formic acid, and it is advantageous to add a base, preferably an alkali metal hydroxide, carbonate, or bicarbonate, in sufficient quantity to transform part of the formic acid to the corresponding alkali metal formate. Doing that will insure that any acids stronger than formic acid will be neutralized. If strong acids are removed in other ways, there is no need to buffer the formic acid in this manner before reacting it with 15(S)-PGE$_1$.

The reaction of formic acid with 15(S)-PGE$_1$ is carried out in the range 10° to 50° C. At lower temperature the desired formate production is inconveniently slow. At higher temperatures, undesired side reactions reduce the yield of the desired formates. It is also advantageous to exclude oxygen during this reaction, advantageously by flushing air from the reaction vessel with an inert gas, e.g., nitrogen, helium, or argon, and then maintaining a slight positive pressure of said gas in the vessel throughout the reaction.

A mixture of 15(R)-PGE$_1$ 15-formate and 15(S)-PGE$_1$ formate is produced by this reaction between 15(S)-PGE$_1$ and formic acid. This mixture of formates is then hydrolyzed directly to the corresponding mixture of 15(S)-PGE$_1$ and 15(R)-PGE$_1$, which are then separated. Alternatively, the mixture of formates is separated first, and then the 15(R)-PGE$_1$ 15-formate is hydrolyzed to 15(R)-PGE$_1$. When 15(R)-PGE$_1$ is the sole desired product, the first route is preferred, because the 15(S)-PGE$_1$ also produced is then available after separation as a reactant to produce more of the same mixture of R and S formates. If the useful 15(S)-PGE$_1$ 15-formate is a desired product, then, of course, the second route would be used.

Separation of either the R and S formate mixture or the 15(R)-PGE$_1$–15(S)-PGE$_1$ mixture is accomplished by known separation procedures. Especially useful here is chromatography, advantageously on silica gel. Acid-washed silica gel is preferred to minimize deformylation or other molecular changes during chromatography.

Hydrolysis of the R formate or the R and S formate mixture is accomplished by reaction with base under mild conditions. Suitable bases are alkali metal bicarbonates and carbonates. Alkali metal hydroxides are also operable but likely to cause undesired side reactions. A mixture of water and sufficient of a water-miscible organic diluent to give a homogenous hydrolysis reaction mixture is used as a solvent. Examples of such diluents are lower alkanols, e.g., methanol and ethanol, and lower alkanones, e.g., acetone. It is also advantageous to exclude oxygen as in the formic acid reaction.

For this base hydrolysis, a temperature range 10° to 50° C. is operable. At lower temperatures, the hydrolysis is inconveniently slow. At higher temperatures, undesired side reactions, especially with alkali metal hydroxides, reduce the yield of the desired products.

An alternative hydrolysis procedure uses a catalytic amount of an organic sulfonic acid, e.g., p-toluenesulfonic acid or methanesulfonic acid in the presence of an organic diluent, e.g., methanol.

The desired products are isolated from the formic acid and/or hydrolysis reaction mixture and purified by standard procedures, e.g., removal of solvents and diluents by evaporation, followed by extraction and chromatography.

Esterification of 15(R)-PGE$_1$ or any of its diacylates (Formula I, R$_1$=H), or of 15(S)-PGE$_1$ formate (Formula V, R$_1$=H) is carried out by interaction of the acid with the appropriate diazohydrocarbon. For example, when diazomethane is used, the methyl esters are produced. Similar use of diazoethane, diazobutane, and 1-diazo-2-ethylhexane, for example, gives the ethyl, butyl, and 2-ethylhexyl esters, respectively.

Esterification with diazohydrocarbons is carried out by mixing a solution of the diazohydrocarbon in a suitable inert solvent, preferably diethyl ether, with the Formula I or Formula V acid reactant, advantageously in the same or a different inert diluent. After the esterification reaction is complete, the solvent is removed by evaporation and the ester purified if desired by conventional methods, preferably by chromatography. It is preferred that contact of the acid reactants with the diazohydrocarbon be no longer than necessary to effect the desired esterification, preferably about one to about ten minutes, to avoid undesired molecular changes. Diazohydrocarbons are known in the art or can be prepared by methods known in the art. See, for example, Organic Reactions, John Wiley & Sons, Inc., New York, N.Y., vol. 8, pp. 389–394 (1954).

An alternative method for esterification of the carboxyl moiety of Formula I or Formula V reactants comprises transformation of the free acid to the corresponding silver salt, followed by interaction of that salt with an alkyl iodide. Examples of suitable iodides are methyl iodide, ethyl iodide, butyl iodide, isobutyl iodide, tert-butyl iodide, and the like. The silver salts are prepared by conventional methods, for example, by dissolving the acid in cold dilute aqueous ammonia, evaporating the excess ammonia at reduced pressure, and then adding the stoichiometric amount of silver nitrate.

Carboxyacylation of the two hydroxy moieties in 15(R)-PGE$_1$ and its alkyl esters (Formula I wherein R$_2$ is hydrogen) is accomplished by interaction of the hydroxy compound with a carboxyacylating agent, preferably the anhydride of an alkanoic acid of one to 8 carbon atoms, inclusive. For example, use of acetic anhydride gives the corresponding diacetate. Similar use of propionic anhydride, isobutyric anhydride, and hexanoic acid anhydride gives the corresponding dicarboxyacylates.

The carboxyacylation is advantageously carried out by mixing the hydroxy compound and the acid anhydride, preferably in the presence of a tertiary amine such as pyridine or triethylamine. A substantial excess of the anhydride should be used, preferably about 10 to about 10,000 moles of anhydride per mole of the hydroxy compound reactant. The excess anhydride serves as a reaction diluent and solvent. An inert organic diluent, for example, dioxanes, can also be added. It is preferred to use enough of the tertiary amine to neutralize the carboxylic acid produced by the reaction, as well as any free carboxyl groups present in the hydroxy compound reactant.

The carboxyacylation reaction is preferably carried out in the range about 0° to about 100° C. The necessary reaction time will depend on such factors as the reaction temperature, and the nature of the anhydride and tertiary amine reactants. With acetic anhydride, pyridine, and a 25° C. reaction temperature, a 12 to 24-hour reaction time is used.

The carboxyacylated product is isolated from the reaction mixture by conventional methods. For example, the excess anhydride is decomposed with water, and the resulting mixture acidified and then extracted with a solvent such as diethyl ether. The desired carboxyacylate is recovered from the diethyl ether extract by evaporation. The carboxyacylate is then purified by conventional methods, advantageously by chromatography.

The Formula I or Formula V acids (R$_1$=hydrogen) are transformed to pharmacologically acceptable salts by neutralization with appropriate amounts of the corresponding inorganic or organic base, examples of which correspond to the cations and amines listed above. These transformations are carried out by a variety of procedures known in the art to be generally useful for the preparation of inorganic, i.e., metal or ammonium salts, amine acid addition salts, and quaternary ammonium salts. The choice of procedure depends in part upon the solubility characteristics of the particular salt to be prepared. In the case of the inorganic salts, it is usually suitable to dissolve the Formula I or Formula V acid in water containing the stoichiometric amount of a hydroxide, carbonate, or bicarbonate corresponding to the inorganic salt desired. For example, such use of sodium hydroxide, sodium carbonate, or sodium bicarbonate gives a solution of the sodium salt of the prostanoic acid derivative, Evaporation of the water or addition of a water-miscible solvent of moderate polarity, for example, a lower alkanol or a lower alkanone, gives the solid inorganic salt if that form is desired.

To produce an amine salt, the Formula I or Formula V acid is dissolved in a suitable solvent of either moderate or low polarity. Examples of the former are ethanol, acetone, and ethyl acetate. Examples of the latter are diethyl ether and benzene. At least a stoichiometric amount of the amine corresponding to the desired cation is then added to that solution. If the resulting salt does not precipitate, it is usually obtained in solid form by addition of a miscible diluent of low polarity or by evaporation. If the amine is relatively volatile, any excess can easily be removed by evaporation. It is preferred to use stoichiometric amounts of the less volatile amines.

Salts wherein the cation is quaternary ammonium are produced by mixing the Formula I or Formula V acid with the stoichiometric amount of the corresponding quaternary ammonium hydroxide in water solution, followed by evaporation of the water.

The invention can be more fully understood by the following examples.

EXAMPLE 1

15(S)-PGE$_1$ 15-formate and 15(R)-PGE$_1$ 15-formate

A solution of sodium carbonate (50 mg.) in 7.5 ml. of dry formic acid is added to 250 mg. of 15(S)-PGE$_1$. This mixture is stirred under nitrogen at 25° C. for 2 hours. The reaction mixture is evaporated under reduced pressure. Benzene is added to the residue, and the mixture is again evaporated under reduced pressure. The residue is then chromatographed on 50 g. of silica gel (acid washed to pH 4; 100–200 U.S. mesh; Mallinckrodt Silicar CC–4), eluting with 2.5 l. of a gradient of 25 to 75% ethyl acetate-isomeric hexane mixture (Skellysolve B), and collecting 100-ml. fractions.

Eluate fractions 7 and 8 are combined and evaporated to dryness under reduced pressure to give 68 mg. of 15(R)-PGE$_1$ 15-formate.

Eluate fractions 9, 10, and 11 are combined and evaporated to dryness under reduced pressure to give 99 mg. of 15(S)-PGE$_1$ 15-formate. The N.M.R. spectrum, recorded on a Varian A–60 spectrophotometer on a deuterochloroform solution with tetramethylsilane as an internal standard, shows peaks at 8.15, 6.1, 5.75, 5.45, and 4.18$\delta$.

15(R)-PGE$_1$ 15-formate moves slightly faster than 15(S)-PGE$_1$ 15-formate on a thin layer silica gel plate with the A–IX solvent system.

EXAMPLE 2

15(R)-PGE$_1$

Following the procedure of Example 1, but combining and evaporating fractions 7 to 11, 100 mg. of a mixture of 15(S)-PGE$_1$ 15-formate and 15(R)-PGE$_1$ 15-formate is obtained. This mixture is dissolved in a mixture of 10 ml. of methanol and 2.5 ml. of saturated aqueous sodium bicarbonate solution. The solution is stirred under nitrogen at 25° C. for 2.5 hours. Then 5 ml. of water and 2 ml. of 1 N hydrochloric acid are added, and the methanol is removed under reduced pressure. The aqueous residue is then adjusted to pH 2–3, and extracted three times with ethyl acetate. The combined extracts are washed with water, dried, and evaporated. The residue is chromatographed on 20 g. of the same silica gel used in Example 1, eluting with successive 100-ml. portions of 60% ethyl acetate-cyclohexane, 80% ethyl acetate-cyclohexane, 100% cyclohexane, and 5% methanol-ethyl acetate, and collecting 15-ml. eluate fractions.

Fractions 13 to 17 are combined and evaporated to dryness to give 13 mg. of 15(R)-PGE$_1$. N.M.R. spectrum, as recorded in Example 1, shows peaks at 5.7, 5.35, and 4.15 (multiplet) $\delta$. The mass spectrum (Atlas CH-4 mass spectrometer; TO-4 source; ionization voltage 70 ev.) is the same as for 15(S)-PGE$_1$.

Fractions 23, 24, and 25 are combined and evaporated to dryness to give 47 mg. of 15(S)-PGE$_1$.

EXAMPLE 3

15(R)-PGE$_1$

A solution of sodium bicarbonate (300 mg.) in 15 ml. of formic acid (M.P. 7.25° C.) is added to 500 mg. of 15(S)-PGE$_1$. The mixture is stirred under nitrogen at 25° C. for 2 hours. The reaction mixture is evaporated under reduced pressure. Benzene is added to the residue, and the mixture aagin evaporated under reduced pressure. To the residue is then added a mixture of methanol (25 ml.) and saturated aqueous sodium bicarbonate solution (5 ml.). This mixture is stirred under nitrogen at 25° C. for one hour. After standing at 5° C. for 15 hours, the solution is evaporated to an aqueous residue, which is adjusted to pH 2–3 and extracted three times with ethyl acetate. The combined extracts are washed with water, dried, and evaporated. The residue is chromatographed on 100 g. of the same silica gel used in Example 1, eluting with 3 l. of a gradient of 25% to 100% ethyl acetate-isomeric hexane mixture (Skellysolve B), and collecting 100-ml. eluate fractions.

Fractions 22, 23, and 24 are combined and evaporated to give 84 mg. of 15(R)-PGE$_1$.

Fractions 27 to 33 are combined and evaporated to give 259 mg. of 15(S)-PGE$_1$.

EXAMPLE 4

15(R)-PGE$_1$ methyl ester

15(R)-PGE$_1$ (2 mg.) is dissolved in a mixture of methanol and diethyl ether. A diethyl ether solution of diazomethane (about 200 mg.) is added, and the mixture is allowed to stand at about 25° C. for 5 minutes. The reaction mixture is then evaporated to dryness to give 15(R)-PGE$_1$ methyl ester.

Following the procedure of Example 4 but using in place of diazomethane, diazoethane, diazobutane, and 1-diazo-2-ethylhexane, there are obtained the ethyl, butyl, and 2-ethylhexyl esters, respectively, of 15(R)-PGE$_1$.

Also following the procedure of Example 4, 15(S)-PGE$_1$ 15-formate is transformed to the corresponding methyl, ethyl, butyl, and 2-ethylhexyl esters.

EXAMPLE 5

15(R)-PGE$_1$ 11α,15(R)-diacetate

15(R)-PGE$_1$ (2 mg.) is mixed with acetic anhydride (0.5 ml.) and pyridine (0.5 ml.), and the mixture is allowed to stand at 25° C. for 18 hours. The reaction mixture is then cooled with ice, diluted with water, and acidified with dilute hydrochloric acid to pH 1. That mixture is extracted three times with diethyl ether. The diethyl ether extracts are combined, and washed successively with dilute hydrochloric acid, dilute aqueous sodium bicarbonate solution, and water. The diethyl ether is then evaporated to give 15(R)-PGE$_1$ 11α,15(R)-diacetate.

Following the procedure of Example 5, but replacing the acetic anhydride with propionic anhydride, isobutyric anhydride, and hexanoic acid anhydride, the corresponding 11α,15(R)-dicarboxyacyl derivatives of 15(R)-PGE$_1$ are obtained. Also following the procedure of Example 5, 15(R)-PGE$_1$ methyl ester, 15(R)-PGE$_1$ ethyl ester, 15(R)-PGE$_1$ butyl ester, and 15(R)-PGE$_1$ 2-ethylhexyl ester are each transformed to the corresponding 11α,15(R)-diacetate.

EXAMPLE 6

15(R)-PGE$_1$ sodium salt

15(R)-PGE$_1$ (2 mg.) is dissolved in 3 ml. of water-ethanol (1:1). The solution is cooled to about 10° C., and is neutralized with an equivalent amount of 0.1 N aqueous sodium hydroxide solution. Evaporation to dryness gives 15(R)-PGE$_1$ sodium salt.

Following the procedure of Example 6, 15(S)-PGE$_1$ 15-formate and 15(R)-PGE$_1$ 11α,15(R) diacetate are each transformed to the corresponding sodium salt.

Also following the procedure of Example 6 but using potassium hydroxide, calcium hydroxide, tetramethylammonium hydroxide, and benzyltrimethylammonium hydroxide, in place of sodium hydroxide there are obtained the corresponding salts of 15(R)-PGE$_1$, 15(S)-PGE$_1$ 15-formate, and 15(R)-PGE$_1$ 11α,15(R)-diacetate.

What is claimed is:

1. A compound of the formula:

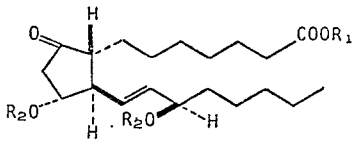

wherein R$_1$ is hydrogen, alkyl of one to 8 carbon atoms, inclusive, or a pharmacologically acceptable cation, and R$_2$ is hydrogen or alkanoyl of one to 8 carbon atoms, inclusive.

2. A compound according to claim 1 wherein R$_1$ and R$_2$ are hydrogen.

3. A compound of the formula:

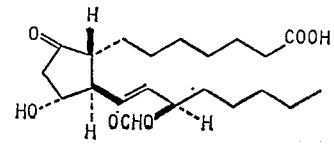

4. A compound of the formula:

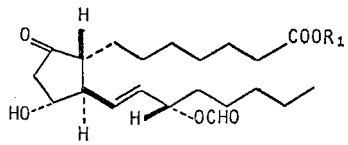

wherein R$_1$ is hydrogen, alkyl of one to 8 carbon atoms, inclusive, or a pharmacologically acceptable cation.

5. A compound according to claim 4 wherein R$_1$ is hydrogen.

References Cited

UNITED STATES PATENTS 3,072,688   1/1963   Hess _____ 260—397.4 S

FOREIGN PATENTS 6011478   2/1967   Netherlands _____ 260—488

OTHER REFERENCES

Weinheimer et al., Abstract A.C.S., Sept. 8–12, 1969.
Fieser et al., Reagents for Org. Syn. 1967, pp. 1187–8.
Schneider et al., J.A.C.S. 90, 5895 (1968).
Corey et al., J.A.C.S. 90, 3247 (1968).
Just et al., Tet. Letters 2093 (1967).

LORRAINE A. WEINBERGER, Primary Examiner

R. GERSTL, Assistant Examiner

U.S. Cl. X.R.

260—211 R, 247.2 R, 247.2 B, 268 R, 294 D, 294.3 A, 326.3, 410, 429.9, 430, 439 R, 448 R, 468 R, 501.1, 501.15, 501.17, 514 R; 424—305, 317